United States Patent
Hicks et al.

(10) Patent No.: US 6,549,823 B1
(45) Date of Patent: Apr. 15, 2003

(54) APPARATUS AND METHODS FOR CUTTING CHEESE

(75) Inventors: Nigel Lyndon Hicks, Bath (GB); Nicholas Paul Lambert, Dorset (GB)

(73) Assignee: Marchant Schmidt, Inc., Fond du Lac, WI (US)

( * ) Notice: Subject to any disclaimer, the term of this patent is extended or adjusted under 35 U.S.C. 154(b) by 0 days.

(21) Appl. No.: 09/466,005

(22) Filed: Dec. 17, 1999

(30) Foreign Application Priority Data

Dec. 17, 1998 (GB) .............................................. 9827855

(51) Int. Cl.[7] .............................................. G05B 19/18
(52) U.S. Cl. ................................ 700/159; 83/72; 83/77
(58) Field of Search .............................. 700/159, 160, 700/169, 170, 171, 173, 174, 195; 83/72, 77, 364, 365, 370, 4.31, 76.6, 76.8

(56) References Cited

U.S. PATENT DOCUMENTS

| | | | | |
|---|---|---|---|---|
| 4,004,035 A | * | 1/1977 | Hirzel et al. ................. | 426/275 |
| 4,318,321 A | | 3/1982 | De Mattos .................... | 83/75.5 |
| 4,379,416 A | * | 4/1983 | Kuchler .......................... | 83/23 |
| 4,436,012 A | * | 3/1984 | Hochanadel ............... | 83/409.2 |
| 4,646,602 A | * | 3/1987 | Bleick ........................... | 83/408 |
| 4,868,951 A | * | 9/1989 | Akesson et al. ............ | 177/145 |
| 4,991,477 A | * | 2/1991 | Butt et al. ..................... | 83/35 |
| 5,125,303 A | * | 6/1992 | Hoyland ....................... | 53/517 |
| 5,267,168 A | * | 11/1993 | Antonissen et al. .......... | 348/89 |
| 5,480,666 A | * | 1/1996 | Lindgren .................... | 426/512 |
| 6,164,174 A | * | 12/2000 | Sigurdsson et al. ............ | 83/13 |

FOREIGN PATENT DOCUMENTS

| | | |
|---|---|---|
| DK | 0538175 A1 * | 4/1993 |
| EP | 0 434 853 | 7/1991 |
| GB | 1 372 873 | 11/1974 |
| GB | 1 578 721 | 11/1980 |
| GB | 2 225 929 | 6/1990 |

* cited by examiner

*Primary Examiner*—Leo Picard
*Assistant Examiner*—Chad Rapp
(74) *Attorney, Agent, or Firm*—Reinhart Boerner Van Deuren s.c.

(57) ABSTRACT

Apparatus for cutting cheese blocks (1) into portions (13) conveys the cheese along a linear processing path. Longitudinal cutters (6,7) for dividing the depth and width of the cheese block, with separation of layers when the depth is divided, create sets (120) of longitudinal sticks (12) conveyed side-by-side. These are presented to a guillotine cutter (8) which, on the basis of measured length and weight of the set (120), makes successive transverse cuts dividing the stick set (120) into successive sets (130) of portions (13) which are then separated from one another for packaging. A control processor (CP) uses measured block weight and dimensional information to determine an optimal disposition of cuts taking account of product standard criteria (e.g. maximum permissible deviation from and maintenance of an average portion weight) together with minimized wastage. A refinement takes into account weight and/or dimensional data from other blocks in order to further reduce wastage by allowing one block's deviation from the norm to compensate for another block's deviation.

19 Claims, 5 Drawing Sheets

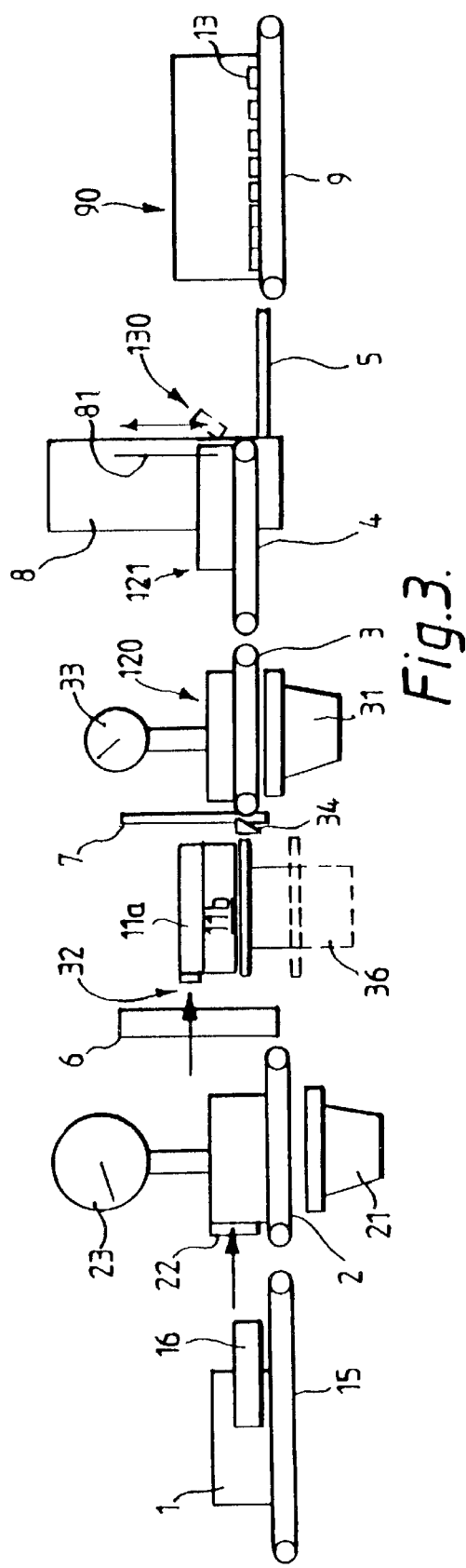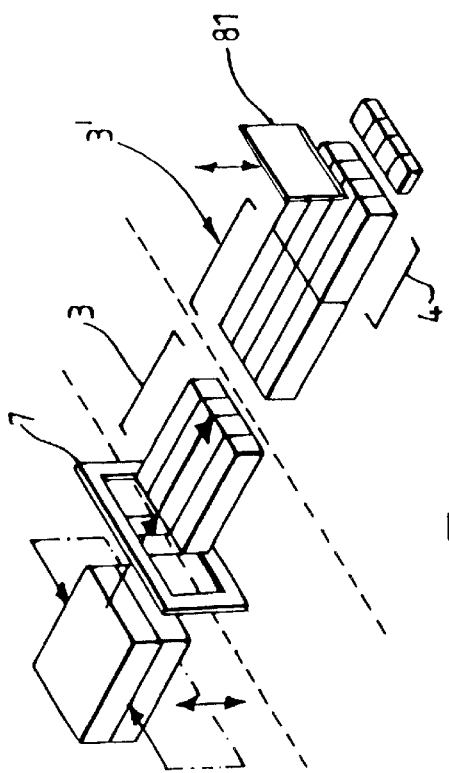

APPARATUS AND METHODS FOR CUTTING CHEESE

FIELD OF THE INVENTION

This invention has to do with methods and apparatus for cutting large blocks of cheese into portions, e.g. for packaging.

BACKGROUND OF THE INVENTION

Various automated systems exist for doing this. A manufactured block of cheese—usually rectangular and weighing for example 20 kg, or 640 lb in the US,—has to be divided into portions whose weight and shape generally need to be selected according to various criteria depending on the type of cheese, the end user, prevailing commercial regulations and so forth.

Issues of practical significance in an automated system include the following (not necessarily all together):

that the system will cut up a large number of blocks without failing, jamming or damaging the cheese;

that the system is sufficiently versatile to be able to cut to different geometries according to the end use and other criteria;

that the system presents the cut portions separated from or easily separable from one another so that they can conveniently be presented to a packaging machine;

that the system can cut to satisfy a target weight criterion for the portions, e.g. by cutting to maintain an average portion weight and deviation from the average within set limits, with reliability and low wastage;

that the system be as compact as possible on the factory floor, and fast and convenient to operate, maintain and adjust.

These are difficult things to achieve, particularly in combination, not least because cheese is in itself a difficult product to handle and furthermore because typically the original large blocks vary significantly from one another (in shape, weight, density and dimensions) and these variations need to be accommodated by the cutting system.

PRIOR ART

By way of introduction, the operation of a sophisticated known system (our own Wright Pugson C33) is shown schematically in FIG. 1. The incoming cheese block 1 of height H width W and length L is presented at a weighing and centring station where it is aligned, weighed and its width W and height H measured. These data are input to a control processor CP programmed to determine a suitable cut geometry, at least for the vertical-longitudinal ($vl_{1,2}$) and horizontal ($h_1$) i.e. depth cuts. The program is operable according to various operator requirements. One important regime operates with a view to forming the largest possible number of portions in a predetermined target weight range, maintaining a required average weight and with minimum wastage. The control processor CP is therefore connected to control the cut geometry by adjusting the spacing of cutter elements (metal wires or blades set in a frame) in first-stage and second-stage cutting stations 6', 7' which respectively form the horizontal (depth) and vertical-longitudinal cuts by the block's being pushed through the frame. FIG. 1 shows a version in which the first- and second-stage cutter frames are combined at a single cutting station; they may alternatively be positioned at a spacing. The block, now cut into two layers 11' each made up of longitudinal sticks 12', issues onto a turntable (not shown) where it is rotated through 90° (as described in our GB-A-2225929). Its width (the original length dimension L) is measured and the cutter spacing of a third-stage cutting station 8' adjusted accordingly using the L data together with the weight M and the H and W data gathered previously. The block is then pushed, either as a whole or one layer 11' at a time, through the third-stage cutting station 8' to form the eventual portions 13. The fully-cut block of portions 13 is then dismantled and the portions loaded onto a packing machine either manually or by an automated procedure; see for example our GB-A-2285962.

SUMMARY OF THE INVENTION

Our new proposals relate to apparatus and methods for cutting cheese blocks into portions, including (a) optionally, making one or more longitudinal cuts to divide the width of the block;

(b) making plural transverse cuts to divide the length of the block, and (c) optionally, making one or more longitudinal cuts to divide the depth of the block. Usually, at least one and preferably both kinds of longitudinal cut will be made, or at least is/are available to be made.

In a first aspect a longitudinal cutting stage, including making the one or more longitudinal cuts (a) and/or (c) to form a set of longitudinal sticks, is followed by a transverse cutting stage in which the longitudinal sticks are presented together as a set at a transverse cutting station. At the transverse cutting station the transverse cuts (b) are preferably made through the set, forming with each transverse cut a corresponding set of portions. Additionally or alternatively, different sticks of the set may be subjected to different transverse cutting.

A first particular proposal in relation to this aspect is that the transverse cuts be made successively, so as to form sets of portions successively, and separating the successively-formed sets of portions from the residue of the set of sticks. This enables a high rate of formation of portions while moving them progressively downstream in the process. Difficulties in handling and dismantling large fully-cut blocks or part-blocks are thereby reduced or avoided. The sets of portions may be fed successively to the intake of a packaging machine via apparatus for portion orientation and spacing.

The transverse cutting station preferably includes a set separation arrangement which for the making of a transverse cut also moves a respective cut set of portions downstream in the process away from the residue of the set of sticks. For example the cut sets of portions may be on, or be urged or fall onto, a separate conveyor to carry them successively downstream.

The set of sticks is desirably presented unseparated for the transverse cutting, i.e. with the sticks abutting side-by-side along the longitudinal cut(s). This can maximise speed. It is strongly preferred that only one set of sticks be transversely cut at a time, i.e. as a single "layer". Thus, where a cut (c) is made to divide the depth of the block this is preferably done before the transverse cuts (b), preferably also before the longitudinal cut(s) (a), and the resulting layers separated from one another before the transverse cuts are made in each. They may conveniently separate at the longitudinal cutting stage; this is in itself well-known.

It should be noted however that the system may allow for "sets" of only one stick e.g. if it is chosen to make no longitudinal cuts in a given block, or longitudinal cuts in only one sense to create layers which are separated before the transverse cutting.

The direction of the transverse cuts is preferably transverse in space to the longitudinal cutting direction, i.e. the set of sticks is not rotated between the longitudinal and transverse cutting stages.

A convenient and compact arrangement makes the transverse cuts with a cutting movement in the depth direction of the set of sticks, preferably cutting all sticks of the set simultaneously, and/or with an active (driven) cutter element such as a guillotine cutter. An active (e.g. guillotine) cutter is usually stronger and easier to control and maintain than cutter elements in a frame, and well suited to making single successive cuts. Furthermore an indexing conveyor is conveniently used to space the transverse cuts by moving the set of sticks progressively longitudinally relative to the cutter location between cuts. This is much more convenient and can be done with simpler apparatus than is required to control the spacing of a set of cutter elements adapted to make plural cuts simultaneously.

By these means the cutting operation may if wished be done in-line, i.e. from the initial block to a separated set of portions without requiring transverse movements or rotations of the cheese. A straight line is preferred.

The cutting methodology and systems described above are in themselves new and advantageous for the reasons given. Normally it will be desired also to be able to adjust the cut geometry (i.e. the spacing and/or position of cuts in any or all of the three dimensions) not only as part of a pre-operational set up but also as an ongoing matter during operation to take into account variations from one block to another. For example, the user might wish to ensure that each block is cut into the same number of equally-sized portions irrespective of variation in block dimensions, so that there is no wastage. Or, more commonly, there may be a requirement to maintain a weight standard for the portions to a predetermined level of strictness in terms of average and deviation, while nevertheless minimising wastage arising from unavoidable creation of underweight residues.

Therefore it is preferred to measure the length and/or weight for each set of sticks and to determine the spacing of the transverse cuts in dependence on those data. In terms of apparatus, this is provided by means for measuring those parameters, and a control processor adapted to receive the length and/or weight data, programmed to determine a corresponding transverse cut spacing on the selected basis, and connected to cause the transverse cutting station to operate at the determined spacing in making the transverse cuts on that set.

While the simultaneous cutting of a set of sticks can radically enhance the speed of portion production without rushing the operation of the transverse cutter, it will be noted that if a single cutter element is used then all sticks of the set will be subject to the same transverse cut spacing. A possible refinement is to use a transverse cutter arrangement adapted to discriminate between sticks of a set and cut them differently.

In particular, however, to further reduce the possibility of wastage in these circumstances, we propose the following preferred feature. In addition to the measurements referred to above for the set of sticks, the width and/or depth, (preferably both) dimensions of the block are also measured, and the block weight too if portion weight is to be controlled. These measured data are fed to the control processor which uses them to determine the cut geometry for the block for the cuts (a), (b) and (c)—(a) and/or (c) being optional—so as best to satisfy the operational requirements (e.g. target weight, shape restrictions etc.). It should be noted that the principles for programming a control processor to determine a cut geometry can be in themselves generally routine programming and furthermore may be similar to the principles implemented in our known C33 system referred to above.

By this means it becomes possible to control better the shape and size of the longitudinal sticks in dependence on the dimensions of the incoming block, taking into account that the sticks of a given set will be cut together and thereby offsetting a relative lack of flexibility and possible additional wastage which might otherwise result at that stage.

The dimensional and weight data referred to need not all be gathered initially, although they may all be measured on the incoming uncut block. They may additionally or alternatively be measured in turn as they are required for determining cut spacing. Thus for example generally a block dimension will need to be measured before a cutting stage which cuts transverse to that dimension.

Weight and dimensions may be measured by conventional means, for example load cells, mechanical devices using linear or radial transducers, optical devices with analogue outputs etc. Cut spacings may also be controlled by known means. The spacing of plural cutter elements in a cutting arrangement—usually a passive cutter arrangement such as a frame spanned by cutter elements—may be adjusted via a geared electromechanical coupling controlled from the control processor. The spacing of cuts made by a single, e.g. active, cutter may be adjusted—usually more simply and conveniently—by using the control processor to govern the indexing movements of an indexing conveyor which effects relative movement between the cutter and the cheese between cuts.

A further and independent proposal herein, but preferably combined with the specific proposals above relating to sequential transverse cutting of sets, relates to methods and apparatus by which the control processor is used to determine the cut geometry for a given block based on dimensional and/or weight parameters of that block e.g. in a manner described above. Our second proposal relates to systems in which the control processor enables determination of cut geometries to create portions which do not deviate beyond a specified limit above or below a target weight, and which average the target weight. Such processor programming is in itself known.

What we propose is that the control processor bases the cut geometry for a given incoming block not only on the parameters for that block e.g. as aforesaid, but additionally on portion weight parameters determined for one or more other blocks of a series of blocks being cut whose cut geometries, and hence portion weight distribution, have already been determined. For maximum reliability this is best done by actual measurement of the portion weights of portions which have already been cut, feeding accumulated weight data for already-cut portions back to the control processor which determines the cut geometry for subsequent blocks. These portion weight data are then used together with the dimensional and weight data of each incoming block in determining the cut geometry to be applied to the incoming block.

The benefit here is as follows. The control processor is programmed to determine a cut geometry that satisfies predetermined average weight and weight variation restrictions, while minimising wastage. In previous systems this has been done for each block in turn. However by feeding portion weight data from other blocks into the cut geometry determination for a given block, it becomes possible to ensure that the portion weight average is maintained over a number (greater than 1) of blocks, without its necessarily having to be maintained for a given block in isolation. Thus in particular the control processor may be programmed to select a cut geometry for a given block that will divide the block into portions which fall within the permitted limits of portion weight variation, but do not satisfy the portion weight average criterion, because the portion weight average criterion can be satisfied over a larger number of blocks by an opposite deviation from that criterion determined in portions created from other blocks, e.g. which have already been cut.

BRIEF DESCRIPTION OF THE DRAWINGS

Embodiments of the above proposals are now described more specifically with reference to the accompanying drawings, in which

FIG. 3 is a side view, also schematic, of a system embodying the current proposals, emphasising apparatus elements rather than method steps relative to FIG. 2 and also showing some possible variants.

FIG. 4 shows a variant of the first system;

DETAILED DESCRIPTION OF THE PREFERRED EMBODIMENTS

Figure 2:
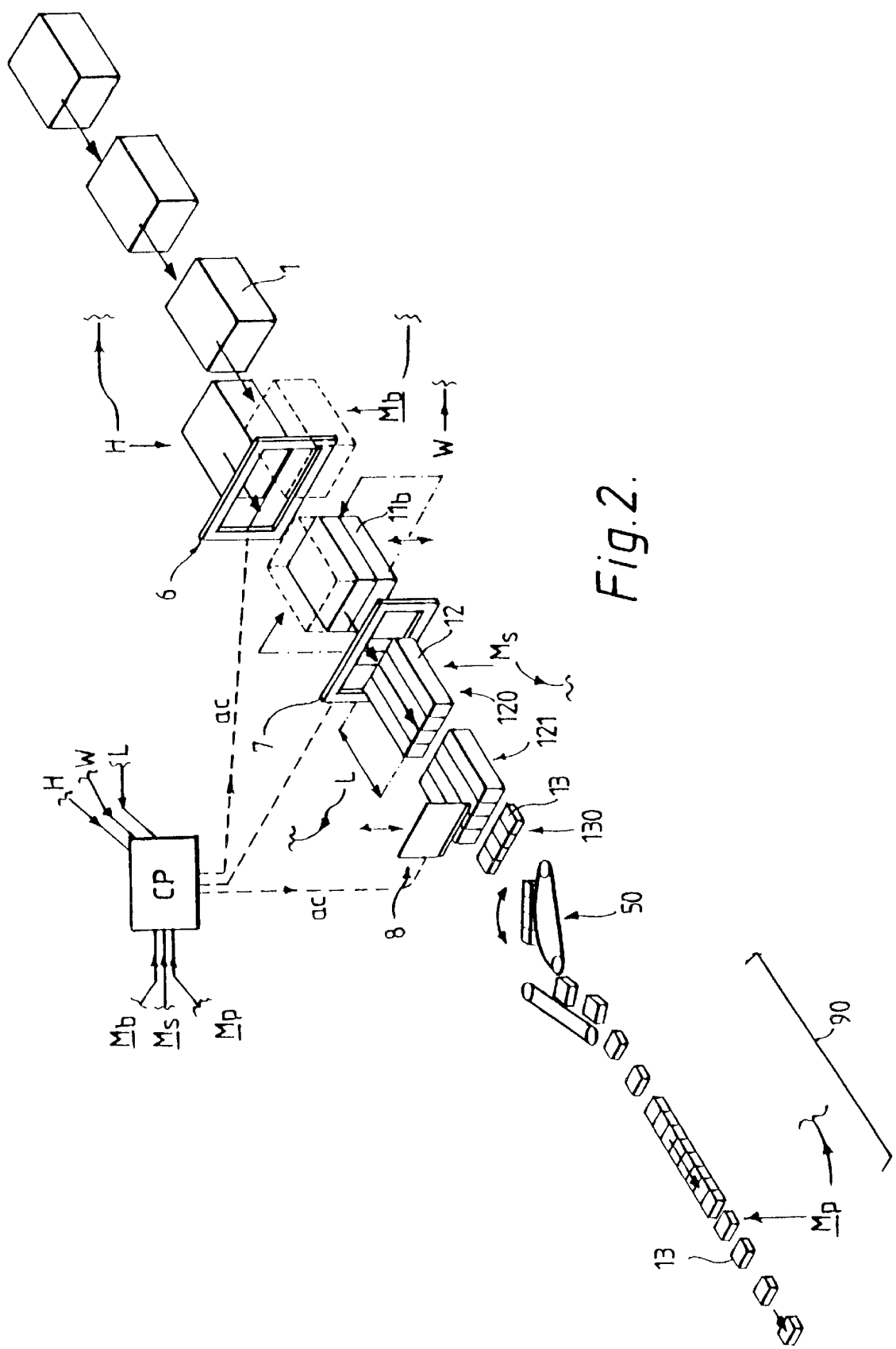
FIG. 2 is a similar schematic of steps applied to blocks of cheese in a first cutting system embodying the present proposals.

With reference to FIG. 2, a procedure for cutting a series of incoming blocks 1 of hard cheese is described. These may be, for example, 20 kg blocks of cheddar from the manufacturing process. The skilled person will understand that cheese blocks come in a variety of shapes and sizes according to the kind of cheese, the method of manufacture, the country of manufacture and so forth. The illustrated procedure would be suitable for cutting, for example, a 20 kg block 1 down into ultimate portions 13 of 250 g each, or some other weight suitable for retail in packaged form.

The left-hand and right-hand ends of FIGS. 2 and 3 respectively show the portions 13 undergoing orientation into a single evenly-spaced file for feed to an automated packaging machine. This is a conventional outcome and is not discussed in detail here, but is included as a general feature of the overall process.

The illustrated cutting stages are as follows. First the block 1 passes from a feed conveyer 15, centred by centring guides 16, onto the conveyer 2 of a block weighing and measurement station where a height measurement sensor 23 determines a height (depth) dimension H for the block and a scale 21 a block weight measurement $M_b$. The exploitation of these measurements is described later. From the belt 2 a pusher device 22, which can be generally conventional in nature, pushes the block through a static first-stage cutter frame 6, having a horizontally-extending cutter wire or blade which divides the depths of the block 1 into upper and lower layers 11a, 11b.

The cutter element(s) may be height-adjustable to vary the depth/number of layers cut; the system may be set or may opt automatically to make no cut of this kind, however.

With reference to the FIG. 2 procedure, the depth-split block is re-centred on the processing path by appropriate guides (not shown) and its width (i.e. horizontally across the processing path) measured to give a width parameter W.

The two layers 11a, 11b of the block are then pushed in turn by a pusher 32 through a second-stage cutting frame 7 having a plurality (here, three) of vertically-extending cutting elements which make longitudinal cuts dividing the layer 11 into a set 120 of sticks 12, oriented side-by-side and extending along the processing path. The first set 120 of sticks to be formed is conveyed clear of the second-stage cutter 7 to make way for the second, formed by the longitudinal cutting of the other layer of the original block.

The length L and weight $M_s$ of each set 120 of sticks 12 is measured and they pass on an indexing conveyer to a third cutting stage 8 to be described shortly.

Next, reference to FIG. 3 elucidates some of the apparatus components and variants which may be involved in these operations.

In particular, between the first and second cutting stations 6,7 a layer-splitting arrangement is depicted including a height-adjustable platform 36 for supporting the depth-divided block, a layer-selective pusher 32 to act at the upstream end of the block, and a threshold 34 to act on the downstream end of the block. Co-operation of the pusher 32 and threshold with adjustment of the platform height enables a first layer 11a to be pushed off the layer 11b beneath without the lower layer shifting, and thence through the second-stage cutting station 7.

Figure 1:
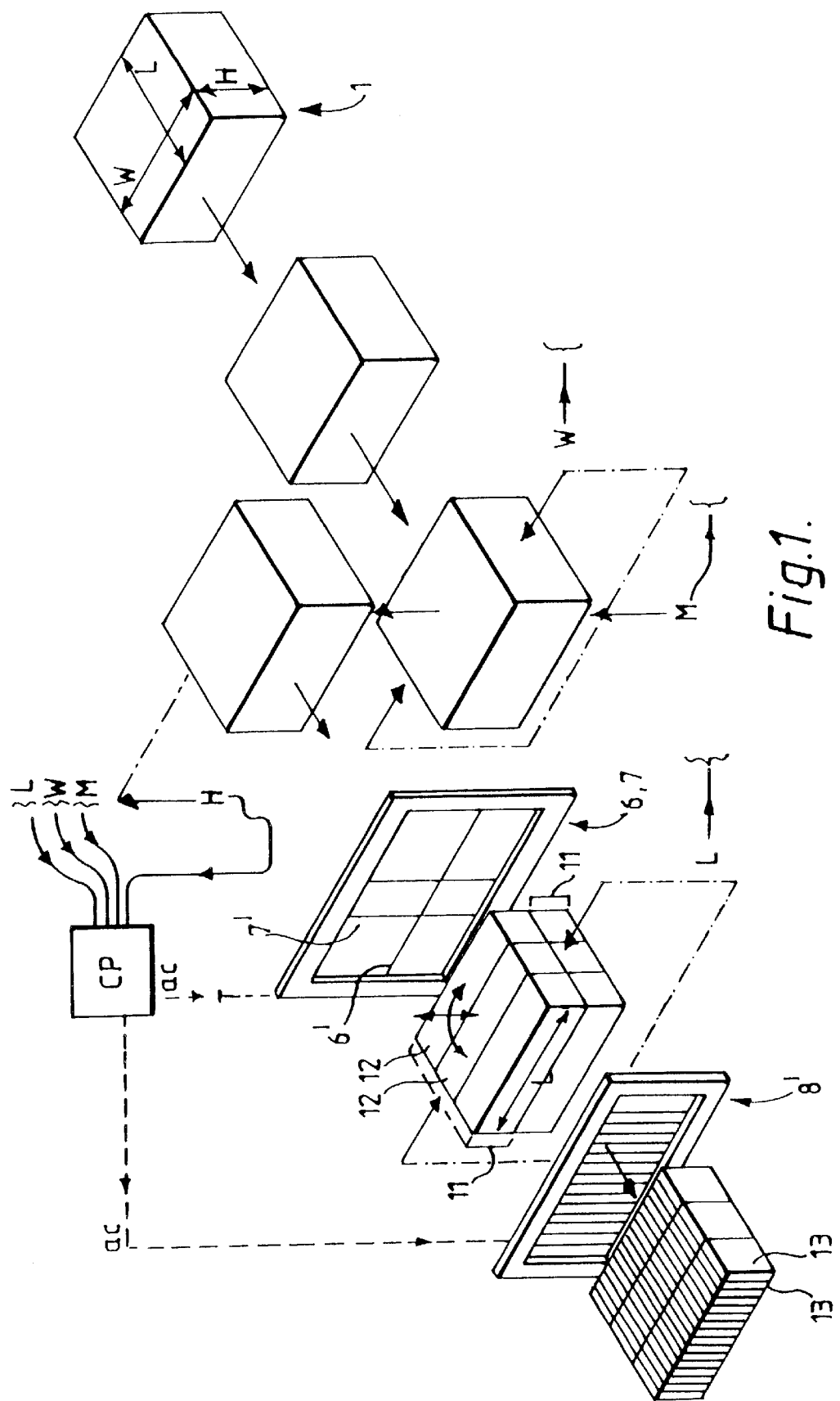
FIG. 1 is a schematic of process steps and apparatus applied to cutting a block of cheese in a known cutting system and has been described above.

It should also be noted that the first and second cutting stages can be combined at one location on the processing path, i.e. the longitudinal cuts can be formed in the same cutting or pushing stroke as the horizontal cut, using a cutter frame with a combination of horizontal and upright cutter elements as was indicated in FIG. 1 for the prior art arrangement. Or, the first stage can be omitted altogether.

The width measurement W needs to be taken before the longitudinal cuts are made, and may be taken at the same measurement station to 21, 23 as the height and weight measurements as indicated in the FIG. 3 scheme, which in this respect is a variant from the FIG. 2 scheme. This possibility exists whether or not the first and second cutting stages are combined.

It will be noted that the length L measured for the set 120 of sticks 12 after the second cutting stage is in fact the length of the original block, and likewise may instead be measured at an earlier stage. However in both the FIG. 2 and FIG. 3 schemes the set 120 of sticks is weighed on a scale 31 and its length L measured by a length sensor 33 while it rests on a first stick set belt 3 downstream of the second cutting stage.

The set of sticks 120 passes in-line onto a second, indexing belt conveyer 4 at whose downstream end a third cutting station having a generally vertically-acting transverse guillotine cutter 81 is arranged. The guillotine cutter 81 has a single vertical blade extending perpendicularly across the processing path adjacent the downturn of the indexing belt 4, so that pieces cut by the guillotine automatically topple onto a first alignment and separation conveyer 5 positioned immediately downstream of the indexing belt 4.

A guillotine cutting station 8 is a construction known per se for cutting sticks of cheese into portions, but here with a width selected to be able to cut right across a set 120 of sticks 12 as required by the present procedure. Thus, each stroke of the guillotine blade 81 separates a set 130 of portions 13 (four in this example) and the portions 13 of the set 130 topple together off the end of the indexing conveyer onto the separation and alignment conveyer 5 where they move on downstream. At the same time the indexing belt 4 advances incrementally, in a manner which is well-known per se in this field, moving a predetermined length of the residue 121 of the set 120 of sticks 12 below the edge of the guillotine 81 to be cut off by its next stroke. This continues until the set of sticks 120 is exhausted and the next one is advanced to take its place. The product of the cutting system shown is a succession of transversely-oriented sets 130 of portions 13 moving in the downstream direction of the system, which as shown operates entirely in-line. No rotations or lateral movements of the cheese are involved at any stage during the cutting procedure.

Subsequently, on the separation and alignment conveyers 5,9, these transversely-oriented sets 130 of portions are brought into file and uniform spacing according to the demands of the packaging machine being used. Specific techniques for aligning, orienting and spacing individual portions are known per se, for example by subjecting the oncoming sets 130 to the action of deflecting conveyers 50 as indicated in FIG. 2, and the details are not germane to the general proposals herein. The illustrated embodiment shows the portions being reduced to a single file; they may however be guided into more than one parallel file if the packaging machine will accept such an input.

The individual portions 13 are weighed to record a portion weight $M_p$ at some stage following their separation from one another, for purposes of monitoring the adherence to prescribed weight standards.

The above description covers the stages of cutting and moving; it has also referred to steps of weighing and measuring but without indicating how these are exploited.

The system includes a control processor CP, which may be a suitably programmed electronic controller. The various measurements taken by the system, namely:

| | | |
|---|---|---|
| H | block height | |
| $M_b$ | block weight | |
| W | block width | |
| L | block length or stick set length | |
| $M_s$ | stick set weight | |
| $M_p$ | individual portion weight | | are all input to the control processor CP. These inputs are shown schematically in FIG. 2.

The control processor is connected by respective "adjust cut" ("ac") lines to respective electromechanical arrangements of the first, second and third cutting stages for controlling the number, position and spacing of cutting at each stage. In relation to the first and second stages 6, 7 where the cutter elements are wires or blades held across frames, the cut adjustment may be for example by a geared drive to end retainers of the wires, operated via an electric motor in dependence on cut adjustment instructions coming from the control processor CP. In relation to the guillotine cutting station 8 the adjustment is by control of the size of the increments through which the indexing conveyer belt 4 advances between the cuts.

A feature of the illustrated system is that the control processor CP is programmed to determine the cut geometry as a whole on the basis of a "global" assessment of the block parameters (i.e. the weight, and the measured dimensions transverse to all cuts made). This means that the precise dimensions of the stick 12 which make up each set 120 can be determined with reference to knowledge that the set is to be transversely cut as a set into portions of known target weight. This intelligent assessment of the block 1 may influence the cut positions in all dimensions. For example, the processor CP may determine that the block will be consumed more efficiently by dividing it at the first stage 6 into upper and lower layers 11a, b of unequal depths, or perhaps not at all.

This contrasts with existing systems which use a guillotine cutter to cut sticks into portions. In these existing systems the blocks are cut "blindly" into sticks which are separated and presented individually to the guillotine cutter. The spacing of the guillotine cuts is adjusted according to each stick's measured weight and length, but there is no means of adjusting the stick weight and length on the basis of other data to minimise the wastage when cutting the sticks. Furthermore the present system can have a radically faster output, for example of the order of 300 portions a minute.

A feature lending further sophistication to the control of cut geometry to minimise wastage is indicated in FIG. 2 where, as already mentioned, the accumulated portion weight data $M_p$ is fed back to the cut control processor CP. In the manner described in the first part of this application, this enables portion weight standard requirements to be spread over more than one block, with the result that a block can be cut with minimal or zero wastage despite the individual pieces cut from the block being on average below the declared weight for the batch. A deviation from the standard can be compensated on a controlled basis by a counter-deviation in the cutting of another block whose dimensions differ.

It should be appreciated that this weight control is not always required; in some situations it may be preferred, and the system may be set, to cut the block according to some predetermined pattern irrespective of portion weight.

FIG. 4 shows a variant on the FIG. 2/3 arrangement. An additional, independent buffer conveyor 3' is provided between the stick weighing/measuring conveyor 3 and the indexing conveyor 4 that controls the transverse cutting. This extra conveyor 3' provides an intermediate buffer zone which simplifies the coordination of the differing movement patterns of the stick sets 120 as between the weighing conveyor 3 and the indexing conveyor 4.

Figure 5:
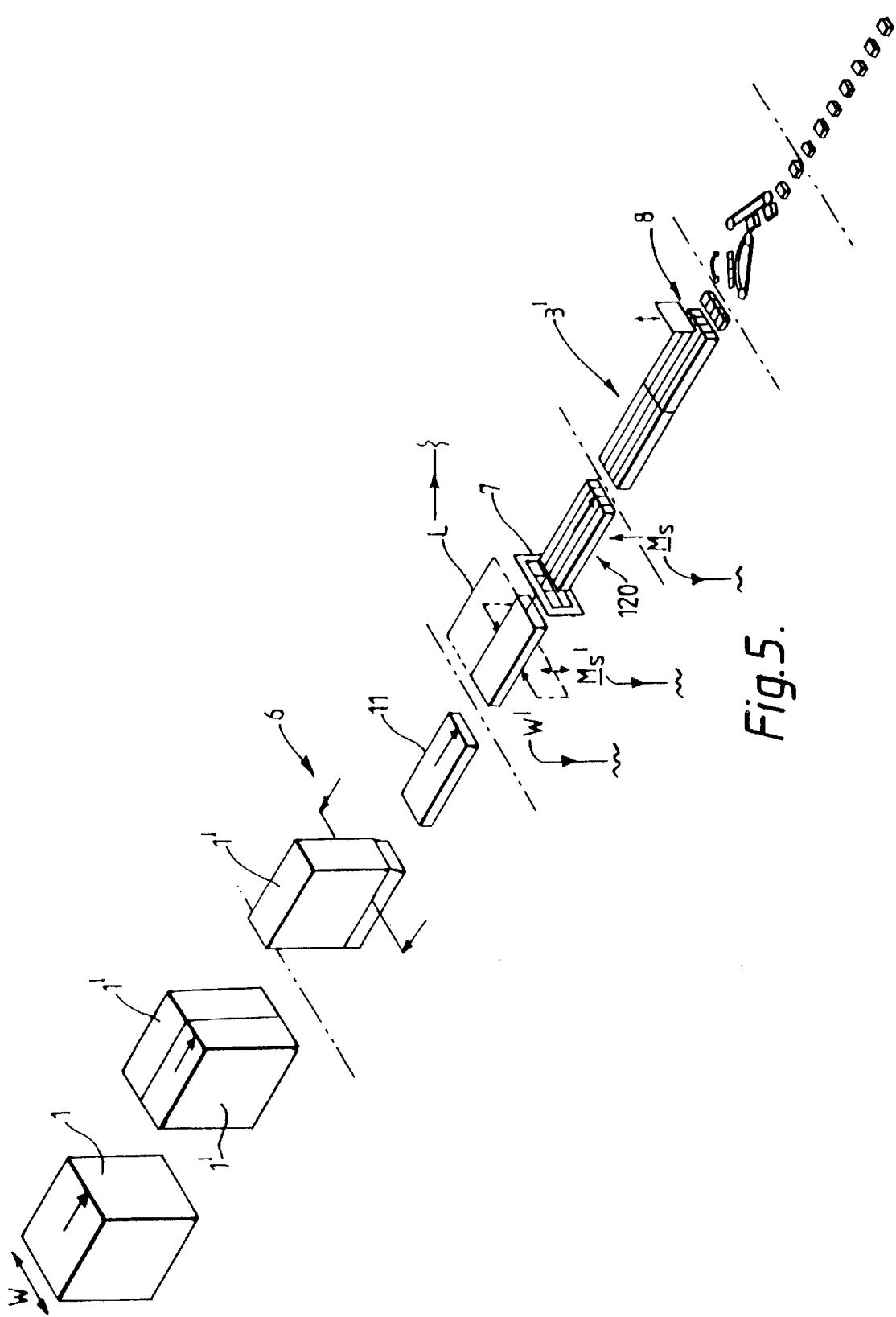
FIG. 5 is a schematic of steps and apparatus components in a second cutting system.

FIG. 5 shows a second embodiment designed to handle very large cheese blocks, for example the 640 lb blocks commonly used in the US. Because of their size and weight these blocks are best preliminarily width-divided as shown, the resulting part-blocks 1' being separated and carried in turn to the stage of depth-division into slabs 11 of single-layer depth. These slabs are then forwarded for a second stage of vertical longitudinal cutting to form the stick sets 120 as before. In this embodiment the length L for the stick set (in fact, the same as the length of the incoming block) is measured at the slab stage immediately before the cutting of the slab into the sticks. The width W' of the slab 11 is also measured at this stage, and because of the initial block division is only part of the width W of the parent block. The stick set weight $M_s$ is measured after the sticks are cut; additionally or alternatively the corresponding weight $M_s$ may be measured on the incoming slab 11.

A buffer zone 3' is provided downstream of the stick cutter, as in the previous embodiment, and the operation of the guillotine cutter 8 is the same as previously.

In this embodiment of the apparatus the control processor (not shown) need not be fed weight/dimension data for the parent block 1 nor the part-block 1', but only the dimensional/weight data specified in the drawing and mentioned above which are needed to govern the choice of spacing for the cuts made by the guillotine 8. Thus, the "intelligence" of the system is localised at the transverse cutting stage.

Figure 6:
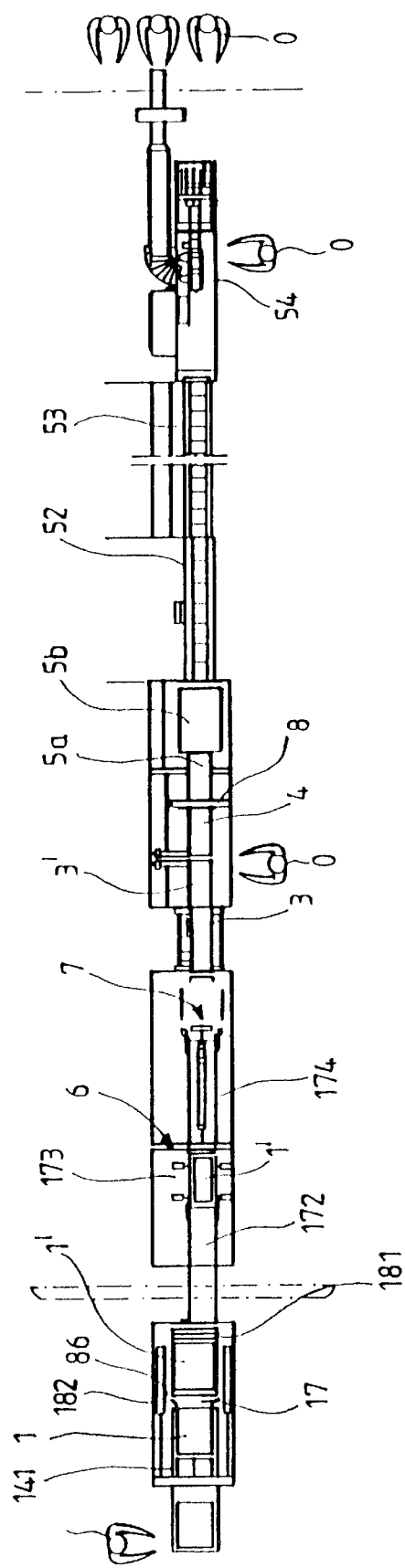
FIG. 6 is a plan view showing a cheese processing line incorporating a cheese cutting and handling system of the FIG. 5 type.

FIG. 6 shows in plan how such a system may be arranged in practice. Workstations for operators O are also shown.

At the left of the figure is a first apparatus module which may be separately provided, to receive the large block 1 and use pushers 141 to divide it into two part-blocks 1' at a preliminary cutter 17. Indexing and transfer cylinders 181, 182 urge the part blocks 1' in turn along the processing path via a buffer conveyor 172 towards the horizontal cutting station 6 where the part block 1' is cut, with the aid of block clamps 173, into the slabs 11 which are passed successively onto a transfer conveyor 174. The upright cutting elements of the stick cutter 7 cut the slab 11 to create a stick set 120 which, as in the previous embodiment, passes to a weighing conveyor 3 where the slab/stick set is weighed before passing, via the buffer conveyor 3', to the processor-controlled indexing conveyor 4 which feeds the guillotine 8. Downstream of the guillotine the portion sets pass via a trim reject conveyor 5a to a single streaming conveyor 5b creating a single line of portions which pass through to a checkweigher 52 and an automatic infeed system 53 for a flow wrap machine 54.

What is claimed is:

1. Apparatus for cutting cheese blocks into portions, the apparatus comprising:

conveyors adapted to receive an incoming cheese block and move the cheese block in a conveying direction along a processing path for cutting;

a longitudinal cutting system arranged to make one or more longitudinal cuts dividing the width and/or depth of the cheese block on the processing path as it moves in the conveying direction, so as to create sets of side-by-side longitudinal sticks;

a transverse cutter arranged to make plural transverse cuts dividing the length of each stick set at controlled spacings to create sets of portions as the stick sets move in the conveying direction, the conveyors including a stick set conveyor operable to convey successive sets from the longitudinal cutting system and present them as stick sets to the transverse cutter; and the transverse cutter being operable to make the transverse cuts for a given stick set successively to create successive sets of portions.

2. Apparatus according to claim 1 in which the transverse cutter is a guillotine cutter with a cutter element movable transversely relative to the conveying direction.

3. Apparatus according to claim 2 in which the stick set conveyor comprises an indexing conveyor which spaces the successive transverse cuts by driving controlled stepwise longitudinal relative movements of the transverse cutter element and the stick set.

4. Apparatus according to claim 1 in which the longitudinal cutting system includes one or more upright cutter elements to divide the width of the cheese block, and the sticks of each set are distributed horizontally.

5. Apparatus according to claim 4 in which the longitudinal cutting system includes at least one substantially horizontal cutting element to divide the depth of the cheese block into two or more layers, and the apparatus includes a layer separator whereby the cut layers of a given block proceed successively along the processing path.

6. Apparatus according to claim 1 comprising means for measuring the weight and dimensions of the cheese block on the processing path, and a control processor operable to determine a disposition of cuts made by the longitudinal cutting system and/or the transverse cutter in dependence on the measured weight and dimensions.

7. Apparatus according to claim 6 in which said measuring means and control processor determine at least a weight and length for the stick set and operate to determine the spacing of the transverse cuts in dependence on those data.

8. Apparatus according to claim 6 in which said measurement means include means for measuring the overall weight and dimensions of an incoming cheese block and the control processor is operable to determine an overall cut geometry for the block, to be implemented by the longitudinal cutting system and transverse cutter.

9. Apparatus according to claim 1 in which a control processor is operable to determine an overall cut geometry for an incoming cheese block based on the measured dimensions and/or weight of the block, and in which the control processor is operable to determine said overall cut geometry in dependence on said weight and/or dimension data for the given block in combination with weight and/or dimension data determined for at least one other cheese block of a series of blocks being cut.

10. Apparatus according to claim 9 including a weigher to determine portion weights of portions which have already been cut, to constitute said weight data of said at least one other cheese block to be taken into account by said control processor.

11. In a method for cutting cheese blocks into portions, including:

(a) making one or more longitudinal cuts to divide the width and/or depth of the block; and (b) making plural transverse cuts to divide the length of the block; the improvement comprising:

making the one or more longitudinal cuts as the cheese blocks move in a longitudinal direction so as to form a set of longitudinal sticks;

making the plural transverse cuts transverse in space to the longitudinal cutting direction by presenting the longitudinal sticks together as a set at a transverse cutting station which makes the transverse cuts through the set;

making the transverse cuts successively so as to form successive sets of portions; and separating the sets of portions from a residue of the set of sticks.

12. A method according to claim 11 in which the transverse cuts are made by an active cutter element and an indexing conveyor spaces the successive transverse cuts by moving the set of sticks or its residue progressively in the longitudinal direction relative to the cutter between cuts.

13. A method according to claim 11 including measuring the length and/or weight of each set of sticks and using a control processor to determine a spacing of the transverse cuts in dependence on those data.

14. A method according to claim 13 including measuring the width and/or depth of the cheese block, and preferably also the block weight, and using the control processor to determine an overall cut geometry for the block.

15. A method according to claim 11 in which a control processor is used to determine an overall cut geometry for the cheese block based on the measured dimensions and/or weight of the block, and in which the control processor determines said overall cut geometry taking into account weight and/or dimension data measured for at least one other cheese block of a series of blocks being cut.

16. A method according to claim 15 in which said data from at least one other cheese block include measured portion weights of portions which have already been cut.

17. Apparatus for cutting cheese blocks into portions, the apparatus comprising:

conveyors adapted to receive an incoming cheese block and move the cheese block in a conveying direction along a processing path for cutting;

measurement sensors for measuring the weight and dimensions of the cheese block on the processing path;

a longitudinal cutting system arranged to make one or more longitudinal cuts dividing the width and/or depth of the cheese on the processing path, so as to create sets of side-by-side longitudinal sticks;

a transverse cutter arranged to make plural transverse cuts dividing the length of each stick set at controlled spacings to create sets of portions, the conveyors including a stick set conveyor operable to convey successive sets from the longitudinal cutting system and present them as stick sets to the transverse cutter, wherein the transverse cutter is operable to make transverse cuts for a given stick set successively to create successive sets of portions; and a control processor operable to determine a disposition of cuts made by the longitudinal cutting system and/or the transverse cutter in dependence on the measured weight and dimensions, wherein the measurement sensors and the control processor determine at least a weight and length for the stick set and operate to determine the controlled spacings of the transverse cuts in dependence on those data.

18. In a method for cutting cheese blocks into portions, including:

(a) making one or more longitudinal cuts to divide the width and/or depth of the block; and (b) making plural transverse cuts to divide the length of the block; the improvement comprising:

making the one or more longitudinal cuts so as to form a set of longitudinal sticks;

measuring the length and/or weight of each set of sticks and using a control processor to determine a spacing of the transverse cuts in dependence on those data;

making the plural transverse cuts by presenting the longitudinal sticks together as a set at a transverse cutting station which makes the transverse cuts through the set;

making the transverse cuts successively so as to form successive sets of portions; and separating the sets of portions from a residue of the set of sticks.

19. A method according to claim 18 including measuring the width and/or depth of the cheese block, and preferably also the block weight, and using the control processor to determine an overall cut geometry for the block.

\* \* \* \* \*